United States Patent
Chen

(10) Patent No.: US 11,665,724 B2
(45) Date of Patent: *May 30, 2023

(54) SYSTEM INFORMATION TRANSMISSION METHOD, TERMINAL AND NETWORK DEVICE

(71) Applicant: VIVO MOBILE COMMUNICATION CO., LTD., Chang'an Dongguan (CN)

(72) Inventor: Li Chen, Chang'an Dongguan (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/570,160

(22) Filed: Jan. 6, 2022

(65) Prior Publication Data

US 2022/0132512 A1 Apr. 28, 2022

Related U.S. Application Data

(63) Continuation of application No. 16/623,255, filed as application No. PCT/CN2018/090600 on Jun. 11, 2018, now Pat. No. 11,252,734.

(30) Foreign Application Priority Data

Jun. 14, 2017 (CN) .......................... 201710449139.8

(51) Int. Cl.
*H04W 72/53* (2023.01)
*H04W 76/11* (2018.01)
(Continued)

(52) U.S. Cl.
CPC .......... *H04W 72/53* (2023.01); *H04L 5/0055* (2013.01); *H04W 72/30* (2023.01); *H04W 74/0833* (2013.01); *H04W 76/11* (2018.02)

(58) Field of Classification Search
None
See application file for complete search history.

(56) References Cited

U.S. PATENT DOCUMENTS

| | | | | |
|---|---|---|---|---|
| 8,725,681 B1 * | 5/2014 | Bailey | ................... | G06F 16/285 |
| | | | | 707/769 |
| 9,065,545 B2 * | 6/2015 | Earnshaw | ......... | H04W 72/1268 |

(Continued)

FOREIGN PATENT DOCUMENTS

| | | |
|---|---|---|
| CN | 101765214 A | 6/2010 |
| CN | 102158901 A | 8/2011 |

(Continued)

OTHER PUBLICATIONS

First Chinese Office Action related to Application No. 201710449139.8 dated Dec. 5, 2019.

(Continued)

*Primary Examiner* — Faiyazkhan Ghafoerkhan
(74) *Attorney, Agent, or Firm* — von Briesen & Roper, s.c.

(57) ABSTRACT

A system information transmission method, a terminal and a network device are provided. The method includes: sending request information to a network device in the case that target Other SI is to be requested; receiving a random access message two or a random access message four which is sent by the network device based on the request information and carries preset indication information; and determining whether to receive subsequent broadcast information based on the random access message two or the random access message four.

20 Claims, 2 Drawing Sheets

(51) Int. Cl.
*H04L 5/00* (2006.01)
*H04W 74/08* (2009.01)
*H04W 72/30* (2023.01)

(56) References Cited

U.S. PATENT DOCUMENTS

| | | | |
|---|---|---|---|
| 10,009,768 B2* | 6/2018 | Vutukuri | H04W 12/069 |
| 10,200,920 B2* | 2/2019 | Kubota | H04L 12/18 |
| 10,264,453 B2* | 4/2019 | Vutukuri | H04W 12/08 |
| 10,327,264 B2* | 6/2019 | Mallick | H04W 72/12 |
| 10,932,182 B2* | 2/2021 | Pantelidou | H04W 48/10 |
| 11,252,734 B2* | 2/2022 | Chen | H04W 4/06 |
| 2013/0235768 A1* | 9/2013 | Earnshaw | H04W 72/0446 |
| | | | 370/280 |
| 2016/0234736 A1* | 8/2016 | Kubota | H04W 48/12 |
| 2018/0124601 A1* | 5/2018 | Vutukuri | H04W 48/14 |
| 2018/0199266 A1* | 7/2018 | Pantelidou | H04W 72/0446 |
| 2018/0279129 A1* | 9/2018 | Vutukuri | H04W 74/0833 |
| 2019/0174554 A1* | 6/2019 | Deenoo | H04W 72/0453 |
| 2020/0236681 A1* | 7/2020 | Chen | H04W 72/53 |
| 2022/0132512 A1* | 4/2022 | Chen | H04L 5/0055 |
| 2022/0150899 A1* | 5/2022 | Chen | H04L 1/16 |

FOREIGN PATENT DOCUMENTS

| | | | |
|---|---|---|---|
| CN | 102223715 A | 10/2011 | |
| CN | 103516472 A | 1/2014 | |
| CN | 104170508 A | 11/2014 | |
| CN | 106788881 A | 5/2017 | |
| CN | 106792998 A | 5/2017 | |
| CN | 106793140 A | 5/2017 | |
| WO | 2016195617 A1 | 12/2016 | |

OTHER PUBLICATIONS

Extended European search report related to Application No. 18818727.2 dated May 7, 2020.
European Office Action related to Application Na. 18818727.2 dated Oct. 14, 2021.
Non-Final Office Action related to U.S. Appl. No. 16/623,255 dated Jun. 24, 2021.
R2-166343, Source: ZTE, ZTE Microelectronics, "Consiaeration on the Other SI delivery in NR" Document for: Discussion and Decision, Agenda item: 9.2.2.2, Release: 3GPP TSG-RAN WG2 Meeting #95bis, Oct. 10-14, 2016, Kaohsiung.
R2-167580, Source: Huawei, HiSilicon, "Further Considerations of "Other SI"" Document for: Discussion and Decision, Agenda item: 9.2.2.2, Release: 3GPP TSG-RAN2 Meeting #96, Nov. 14-18, 2016, Reno, Nevada, USA.
R2-168750, Source: CMCC, "Further Considerations of Other SI" Document for: Discussion, Agenda item: 9.2.2.2, Release: 3GPP TSG-RAN WG2 Meeting #96, Nov. 14-18, 2016, Reno, Nevada, US.
R2-1705229, Source: LG Electronics Inc., "Other-SI request and acquisition in IDLE/INACTiVE" Document for: Discussion, Agenda item: 10.4.1.4, Release: 3GPP TSG-RAN WG2 Meeting #98, May 15-19, 2017, Hangzhou. China.
International Search Report and Written Opinion related to Application No. PCT/CN2018/090600 dated Jun. 11, 2018.

* cited by examiner

SYSTEM INFORMATION TRANSMISSION METHOD, TERMINAL AND NETWORK DEVICE

CROSS REFERENCE OF RELATED APPLICATION

The present application claims the benefit of and is a continuation application of U.S. patent application Ser. No. 16/623,255 filed on Dec. 16, 2019 which is the U.S. national phase of PCT Application PCT/CN2018/090600 filed on Jun. 11, 2018, which claims a priority of Chinese patent application No. 201710449139.8 filed on Jun. 14, 2017, which is incorporated herein by reference in its entirety.

TECHNICAL FIELD

The present disclosure relates to the field of communication technologies, and in particular, to a system information transmission method, a terminal and a network device.

BACKGROUND

In order to reduce signaling overhead, improve radio resource utilization and reduce network equipment energy consumption, the $5^{th}$ Generation (5G) communication system proposes to classify system information into two categories, one is Minimum System Information (MSI), and the other type is Other System Information (Other SI), also known as On-demand System information (On-demand SI). Other SI contains all system information except Minimum SI. Further, the Other SI is further divided, according to an effective range, into Common System Information (Common SI) shared by a plurality of cells and Cell Specific System Information (Cell Specific SI) for respective cells.

The network device sends the MSI to the terminal UE through a periodic broadcast. Since the Other SI is based on the terminal requirements and is requested by the terminal to the network device. In the 5G system, the network device may configure terminal to request the Other SI through random access message one (MSG1) or message three (MSG3). In the random access procedure, the terminal first randomly selects a Preamble from the random access preamble, and calculates a Random Access Radio Network Temporary Identity (RA-RNTI). The MSG1 (i.e., the Preamble) is sent to the network device on the physical random access channel. The network device calculates the resources (such as uplink resource blocks, modulation and coding policies, etc.) required by the terminal for sending the MSG3, and uses the RA RNTI to send the MSG2 to the terminal through the random access response (RAR) on the physical downlink shared channel resource. At this time, the terminals that transmit the Preamble on the same random access resource may receive the MSG2. Then, the terminal sends the MSG3 to the network device on the physical uplink control channel by using the RNTI of the temporary cell, and the network device then sends the MSG4 to the terminal. The terminal specifically determines whether to send the Other SI request by MSG1 or MSG3 according to the Minimum SI configuration or the type of Other SI. For the request of MSG1 and MSG3, the network device may send an acknowledgement (ACK/HACK) message to confirm whether the corresponding request is received.

After receiving the Other SI request from the terminal, the network device may send the corresponding Other SI to the connected terminal through a dedicated channel, and may also send the corresponding Other SI to terminal in the idle/inactive state through a broadcast. If the terminal in the idle state or the inactive state does not receive the ACK feedback message of the required Other SI request, the Other SI request may be sent again. However, the network device may broadcast all or a part of Other SI at a later time, or may not broadcast any Other SI in a subsequent period of time. As a result, the power consumption of the terminal may be serious if the terminal repeatedly sends the Other SI request when the ACK feedback message is not received.

SUMMARY

In a first aspect, a system information transmission method applied to a terminal side is provided in the present disclosure, including:

sending request information to a network device in the case that target Other System Information (Other SI) is to be requested, where the target Other SI is at least one of Other SI requested by a random access message one or Other SI requested by a random access message three, the Other SI is system information other than minimum system information;

receiving a random access message two or a random access message four which is sent by the network device based on the request information and carries preset indication information; and determining whether to receive subsequent broadcast information based on the random access message two or the random access message four.

In a second aspect, a terminal is provided in the present disclosure, including:

a first sending module, configured to send request information to a network device in the case that target Other System Information (Other SI) is to be requested, where the target Other SI is at least one of Other SI requested by a random access message one or Other SI requested by a random access message three, the Other SI is system information other than minimum system information;

a first receiving module, configured to receive a random access message two or a random access message four which is sent by the network device based on the request information and carries preset indication information; and a first processing module, configured to determine whether to receive subsequent broadcast information based on the random access message two or the random access message four.

In a third aspect, a terminal is provided in the present disclosure, including: a processor, a memory and a computer program stored in the memory and executable by the processor, where the computer program is executed by the processor to perform the system information transmission method hereinabove.

In a fourth aspect, a computer-readable storage medium is provided in the present disclosure, where a computer program is stored in the computer-readable storage medium, where the computer program is executed by the processor to perform the system information transmission method hereinabove.

In a fifth aspect, a system information transmission method applied to a network device side is provided in the present disclosure, including:

receiving request information sent by a terminal in the case that target Other System Information (Other SI) is to be requested by the terminal, where the request information is sent through a random access message one or a random access message three, the target Other SI is at least one of Other SI, the Other SI is system information other than minimum system information;

sending, based on the request information, a random access message two or a random access message four carrying preset indication information to the terminal.

In a sixth aspect, a network device is provided in the present disclosure, including:

a second receiving module, configured to receive request information sent by a terminal in the case that target Other System information (Other SI) is to be requested by the terminal, where the request information is sent through a random access message one or a random access message three, the target Other SI is at least one of Other SI, the Other SI is system information other than minimum system information;

a third sending module, configured to send, based on the request information, a random access message two or a random access message four carrying preset indication information to the terminal.

In a seventh aspect, a network device is provided in the present disclosure, including: a processor, a memory and a computer program stored in the memory and executable by the processor, where the computer program is executed by the processor to perform the system information transmission method hereinabove.

In an eighth aspect, a computer-readable storage medium is provided in the present disclosure, where a computer program is stored in the computer-readable storage medium, where the computer program is executed by the processor to perform the system information transmission method hereinabove.

BRIEF DESCRIPTION OF THE DRAWINGS

In order to more clearly illustrate the technical solutions of the embodiments of the present disclosure, the drawings used in the description of the embodiments of the present disclosure will be briefly described below. It is obvious that the drawings in the following description are only some embodiments of the present disclosure. Other drawings may also be obtained from those of ordinary skill in the art based on these drawings without the inventive labor.

DETAILED DESCRIPTION

The embodiments of the present disclosure are described in details in the following with reference to the drawings. However, it should be understood that, the present disclosure may be implemented in various ways but not limited to the embodiments of the present disclosure. Instead, these embodiments are provided so that the present disclosure may be more fully understood and the scope of the disclosure may be fully conveyed by those skilled in the art.

The terms "first", "second" and the like in the specification and claims of the present application are used to distinguish similar objects, and are not necessarily used to describe a particular order or sequence. It should be understood that the data used may be interchanged where appropriate, such that the embodiments of the present application described herein may be implemented, for example, in a sequence other than those illustrated or described herein. In addition, the terms "comprises" and "comprising" and the variants thereof are intended to cover a non-exclusive inclusion, for example, a process, method, system, product, or device that comprises a series of steps or units is not necessarily limited to those steps or units explicitly listed, but may include the steps or unit that are not explicitly listed or inherent to such processes, methods, products or devices.

Figure 1:
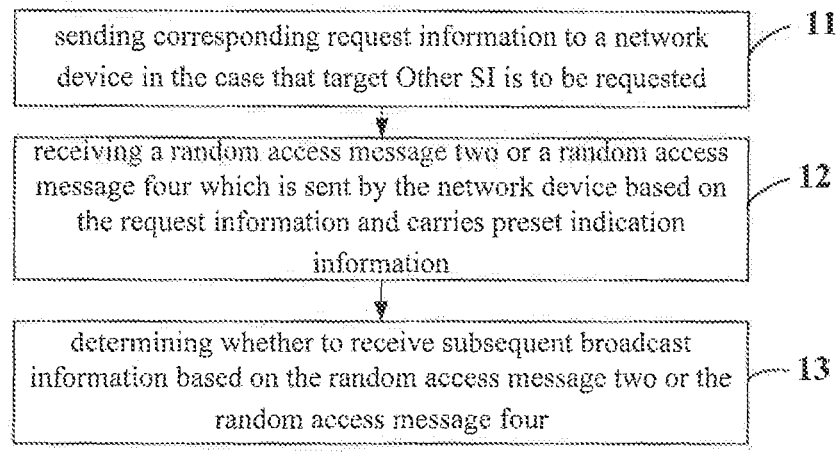
FIG. 1 is a schematic view of a system information transmission method of a terminal side in the embodiments of the present disclosure.

A system information transmission method applied to a terminal side is provided in the embodiments of the present disclosure, as shown in FIG. 1, including:

Step 11: sending corresponding request information to a network device in the case that target Other System Information (Other SI) is to be requested.

The target Other SI is at least one of Other SI requested by a random access message one or Other SI requested by a random access message three, the Other SI is system information other than minimum system information. The request information may be sent through a random access message MSG1 or a random access message three MSG 3. It should be noted that the terminal in the embodiment of the present disclosure refers to a terminal that is in an idle state or an inactive state.

Step 12: receiving a random access message two or a random access message four which is sent by the network device based on the request information and carries preset indication information.

According to the correspondence between the messages in the random access procedure, if the request information is sent by the MSG1, the random access message two MSG2 is received, and if the request information is sent by the MSG3, the random access message four MSG4 is received.

Step 13: determining whether to receive subsequent broadcast information based on the random access message two or the random access message four.

The MSG2 or the MSG4 carries the configuration information for indicating the configuration of the subsequent broadcast information or the indication information indicating whether the subsequent broadcast information carries the target Other SI, so that the terminal may select the subsequent processing behavior according to the received MSG2 or MSG4. When the broadcast information does not broadcast any system information of the target Other SI, the request information may not be repeatedly sent, and the broadcast information of the network device is no longer detected, thereby reducing the power consumption of the network device. Alternatively, when all or a part of the system information in the target Other SI is broadcasted in the subsequent broadcast information, the request information may not be repeatedly sent, and the broadcast information of the network device is received on the preset transmission resource.

The preset indication information carried in the random access message two or the random access message four may be implicit indication information or explicit indication information. The following embodiments of the present disclosure will describe various scenarios of the system information transmission method in case of different indication information.

Scenario 1: the random access message two or the random access message four implicitly indicates the acknowledgement information of the request information.

Step 13 specifically includes: acquiring configuration information of the subsequent broadcast information in the case that the random access message two or the random access message four is received successfully; receiving the subsequent broadcast information through a preset transmission resource in the case that the identity information corresponding to the subsequent broadcast information indicated by the configuration information includes the identity information of all or a part of system information of the target Other SI.

That is, the network device implicitly indicates the ACK information by sending the MSG2 or the MSG4, and the terminal acquires the ACK information indicated implicitly and acquires the configuration information of the subsequent broadcast information, where the configuration information is configured to indicate identity information of the Other SI broadcasted by the subsequent broadcast information, Further, the configuration information may be acquired through the physical downlink control channel PDCCH, MSG2 or MSG4.

Further, Step 13 further includes: detecting the identity information for indicating the Other SI in the minimum system information, in the case that the random access message two or the random access message four is not received by the terminal; receiving the subsequent broadcast information through a preset transmission resource in the case that the identity information of the Other SI includes the identity information of all or a part of system information of the target Other SI, where the identity information of the Other SI is configured to indicate the identity information of the Other SI broadcasted by current broadcast information or the subsequent broadcast information. That is, the network device may carry, through the minimum broadcast information MSI, the identity information of Other SI (SI-ID) to be broadcasted by the current broadcast information and the subsequent broadcast information. The SI-ID specifically includes at least one of the following: Other System Information identity information (SI ID), system information block identity information (SIB ID) corresponding to the Other SI, system information block group identity information (SIB group ID) corresponding to the Other SI and system information block function identity information (SIB Functionality ID) corresponding to the Other SI.

Scenario 2: the indication information is ACK information configured to indicate that the network device receives the request information.

Step 13 flu-tiler includes:

Method 1: acquiring the configuration information of the subsequent broadcast information, in the case that the random access message two or the random access message four carries the ACK information; receiving the subsequent broadcast information through a preset transmission resource, in the case that the identity information corresponding to the subsequent broadcast information indicated by the configuration information includes the identity information of all or a part of system information of the target Other SI.

That is, the network device explicitly indicates that the network device correctly receives the request information and responds to it by transmitting the MSG2 or the MSG4 carrying the ACK information. After receiving the MSG2 or MSG4 carrying the ACK information, the terminal further acquires the configuration information of the subsequent broadcast information. The configuration information is configured to indicate the identity information of the Other SI broadcasted by the subsequent broadcast information. Further, the configuration information may be acquired through the physical downlink control channel PDCCH, MSG2 MSG4.

Method 2: detecting the identity information for indicating the Other SI in the minimum system information, in the case that the random access message two or the random access message four does not carry the ACK information; receiving the subsequent broadcast information through a preset transmission resource, in the case that the identity information of the Other SI includes the identity information of all or a part of system information of the target Other SI.

In Scenario 1, if the ACK information is not carried in the MSG2 or the MSG4 received by the terminal, it is indicated that the network device may send the identity information of the Other SI (SI-ID) broadcasted by the current broadcast information or the subsequent broadcast information by other ways. This refers to that the identity information of the Other SI is indicated by the minimum system information, The identity information of the Other SI is configured to indicate the identity information of the Other SI broadcasted in the current broadcast information or the subsequent broadcast information. The SI-ID specifically includes at least one of the following: Other SI identity information (SI ID), system information block identity information (SIB ID) corresponding to the Other SI, system information block group identity information (SIB group ID) corresponding to the Other SI and system information block function identity information (SIB Functionality ID) corresponding to the Other SI.

Scenario 3: the indication information is ACK information, and the ACK information is configured to indicate that the subsequent broadcast information includes all or a part of system information of the target Other SI.

The ACK information specifically includes at least one of the following: Other SI identity information (SI ID), system information block identity information (SIB ID) corresponding to the Other SI, system information block group identity information (SIB group ID) corresponding to the Other SI and system information block function identity information (SIB Functionality ID) corresponding to the Other SI.

Step 13 further includes:

Method 3: receiving the subsequent broadcast information through a preset transmission resource, in the case that the random access message two or the random access message four carries the ACK information.

That is, the network device explicitly indicates that the network device correctly receives the request information and responds to it by transmitting the MSG2 or the MSG4 carrying the ACK information. After receiving the MSG2 or MSG4 carrying the ACK information, because the ACK information is configured to indicate that the subsequent broadcast information includes all or a part of system information of the target Other SI, the terminal may know, after receiving the MSG2 or MSG4 carrying the ACK information, that the subsequent broadcast information carries all or a part of the target Other SI, so the terminal may receive the corresponding subsequent broadcast information directly through a preset transmission resource.

It should be noted that, because the target Other SI requested by different terminals may be different, the ACKs in this scenario may be for each SIB ID, each SIB group ID, or each SIB Functionality ID.

Method 4: ignoring the subsequent broadcast information, in the case that the random access message two or the random access message four does not carry the ACK information.

If the ACK is not carried in the MSG2 or the MSG4 received by the terminal, it is indicated that the subsequent broadcast information does not carry any target Other SI requested. Therefore, in order to save power consumption, the subsequent broadcast information may be ignored.

Method 5: detecting the identity information for indicating the Other SI in the minimum system information, in the case that the random access message two or the random access message four does not carry the ACK information; receiving the subsequent broadcast information through a preset transmission resource, in the case that the identity information of the Other SI includes the identity information of all or a part of system information of the target Other SI.

The identity information of the Other SI is configured to indicate the identity information of Other SI broadcasted by the subsequent broadcast information. That is, the network device may carry, through the minimum broadcast information MSI, the identity information of Other SI (SI-ID) to be broadcasted by the current broadcast information and the subsequent broadcast information. To save network signaling overhead, when indicating through the MSI, the network device may not send the ACK information repeatedly to indicate that the ACK information is no longer carried in the MSG2 or the MSG4 received by the terminal. However, the identity information of Other SI broadcasted by the subsequent broadcast information may be obtained by detecting the minimum system information.

The SI-ID specifically includes at least one of the following: Other System Information identity information (SI ID), system information block identity information (SIB ID) corresponding to the Other SI, system information block group identity information (SIB group ID) corresponding to the Other SI and system information block function identity information (SIB Functionality ID) corresponding to the Other SI.

It is to be noted that, when the ACK information includes the system information block identity information corresponding to the Other SI, the Step 13 specifically includes: receiving the subsequent broadcast information through a preset transmission resource according to the system information block identity information corresponding to the ACK information, in the case that the random access message two or the random access message four carries the ACK information.

In Scenario 2 and Scenario 3, the indication information is different ACK information. In these scenarios, after receiving the ACK information, the terminal may further perform:

subsequent to the receiving the random access message two or the random access message four which is sent by the network device based on the request information and carries the preset indication information, the method further includes:

in the case that the random access message two or the random access message four carries the ACK information, the method further includes:

stopping sending the request information to the network device, that is, when the terminal receives the ACK information indicating that the network device has responded to the request information, and the request information is not required to be repeatedly transmitted, thereby saving power consumption;

or, stopping sending the request information to the network device within a preset time period, that is, when the terminal receives the ACK information indicating that the network device has responded to the request information, and the request information is not required to be repeatedly transmitted temporarily, thereby saving power consumption; however, in order to receive the requested system information as soon as possible, the request information may be resent after the preset time period, or, activating a prohibit tinier, and prohibiting the corresponding request information from being sent to the network device until the prohibit timer expires, that is, when the terminal receives the ACK information indicating that the network device has responded to the request information, and then the prohibit timer in the terminal is triggered, and the terminal cannot send the request information again until the timer expires, where the prohibit timer may also be for each SIB ID, each SIB group ID, or each SIB Functionality ID.

or, resetting a counter or a timer corresponding to the request information, this is for the scenario of repeatedly transmitting the request information for a plurality of times, when a certain time of request is responded to by the network device, the terminal will reset the corresponding counter or the timer.

After Step 12, the method further includes: resetting the prohibit timer in the case that the received random access message two or the random access message four carries the ACK information.

Scenario 4: the indication information is non-acknowledgement (NACK) information, and the NACK information is configured to indicate that the subsequent broadcast information does not include any system information in the target Other SI within a preset time period.

Step 13 further includes:

Method 6: stopping sending the request information within the preset time period, in the case that the random access message two or the random access message four carries the NACK information.

That is, the network device explicitly indicates, through sending the random access message two MSG2 or the random access message four MSG4 carrying the NACK information, that the network device correctly receives the request information and responds thereto. After receiving the MSG2 or the MSG4 carrying the NACK information, since the NACK information is configured to indicate that subsequent broadcast information does not include any system information of the target Other SI within the preset time period, the terminal may not send the request information again within a preset time period, thereby saving the power.

For example, in the following scenario: the network device cannot respond to the terminal temporarily for some reason, so the terminal is prohibited from transmitting the request information within a preset time period.

Method 7: detecting the identity information for indicating the Other SI in the minimum system information, in the case that the random access message two or the random access message four carries the NACK information; receiving the subsequent broadcast information through a preset transmission resource, in the case that the identity information of the Other SI includes the identity information of all or a part of system information of the target Other SI.

The identity information of the Other SI is configured to indicate the identity information of Other SI broadcasted by the current broadcast information or the subsequent broadcast information. That is, the network device may carry, through the minimum broadcast information MSI, the identity information of Other SI (SI-ID) to be broadcasted by the current broadcast information and the subsequent broadcast information, Although the MSG2 or the MSG4 received by the terminal carries the NACK information, the terminal may further acquire, by detecting the minimum system information, the identity information of Other SI broadcasted by the subsequent broadcast information. The SI-ID specifically includes at least one of the following: Other System Information identity information (SI ID), system information block identity information (SIB ID) corresponding to the Other SI, system information block group identity information (SIB group ID) corresponding to the Other SI and system information block function identity information (SIB Functionality ID) corresponding to the Other SI.

Similar to Scenario 2 and Scenario 3 above, in Scenario 4, after receiving the NACK information, the terminal may further perform:

subsequent to the receiving the random access message two or the random access message four which is sent by the network device based on the request information and carries the preset indication information, the method further includes:

in the case that the random access message two or the random access message four carries the NACK information, the method further includes:

stopping sending the request information to the network device, that is, when the terminal receives the NACK information indicating that the network device has responded to the request information, and the request information is not required to be repeatedly transmitted, thereby saving power consumption;

or, stopping sending the request information to the network device within a preset time period, that is, when the terminal receives the NACK information indicating that the network device has responded to the request information, and it is known through the NACK information that the broadcast information may not send any target Other SI within a preset time period. Therefore, in order to save power consumption, the request information may be resent after the preset time period.

or, activating a prohibit timer, and prohibiting the corresponding request information from being sent to the network device until the prohibit timer expires, that is, when the terminal receives the NACK information indicating that the network device has responded to the request information, and it is known through the NACK information that the broadcast information may not send any target Other SI within a preset time period. Therefore, in order to save power consumption of the terminal, the prohibit timer in the terminal will be triggered, and then the terminal may not send the request information again until the prohibit timer expires, where the prohibit timer may also be for each SIB ID, each SIB group ID, or each SIB Functionality ID.

or, activating a counter or a timer corresponding to the request information, this is for the scenario of repeatedly transmitting the request information for a plurality of times, when the terminal receives the NACK information indicating that the network device has not received the request information, the terminal may resend the request information and activate corresponding counter or the timer.

or, resetting a counter or a timer corresponding to the request information, this is for the scenario of repeatedly transmitting the request information for a plurality of times, when a certain time of request is responded to by the network device, the terminal will reset the corresponding counter or the timer.

Further, after Step 12, the method further includes: resetting the prohibit timer in the case that the received random access message two or the random access message four carries the NACK information, In addition to the application scenario of the system information transmission method, after Step 12, the method further includes: if the random access message two or the random access message four is not received, the corresponding request information is sent to the network device again, For example, each time the message is resent, the retransmission is performed according to the Power ramping mechanism in the related art.

There may be the following situation: the network device does not receive the request information and then does not respond thereto; the network device successfully receives the request information but does not respond thereto by sending the MSG2 or the MSG4; and the network device successfully receives the request information and responds thereto by sending the MSG2 or the MSG4, hut the terminal does not successfully receive the MSG2 or MSG4. In the above cases, the terminal cannot receive MSG2 or MSG4, and then the corresponding request information needs to be resent.

Because there is a case of resending the request information, for the scenario of transmitting the same request information for a plurality of times, the terminal may further perform:

in the case that a number of times sending continuously the request information reaches a preset number of times and neither of the random access message two and the random access message four is received, stopping sending the corresponding request information to the network device, or stopping sending the corresponding request information to the network device within a preset time period, or activating a prohibit timer, where the terminal is prohibited from sending the request information to the network device until the prohibit timer expires.

In the case that a number of times sending continuously the request information reaches a preset number of times and neither of the random access message two and the random access message four is received, the prohibit timer may be activated. Then, when all or a part of system information of the target Other SI requested by the request information is received, the prohibit timer may be deactivated. The prohibit timer may be for each SIBID, each SIB group ID, or each SIB Functionality ID.

According to the system information transmission method in the embodiments of the present disclosure, the terminal sends request information to a network device in the case that the Other SI is to be requested, and then the network device may configure the corresponding random access message two or the random access message four based on the request information and carry the preset indication information therein to indicate the configuration information of the subsequent broadcast information. Therefore, when receiving the random access message two or the random access message four, the terminal may determine the subsequent processing based on the indication information, instead of sending the request information repeatedly in case of not receiving the ACK information, thereby saving the power consumption of the terminal to a certain extent.

The above embodiments describe the system information transmission methods in different scenarios. The following embodiments will further describe the corresponding terminals in conjunction with the drawings.

Figure 2:
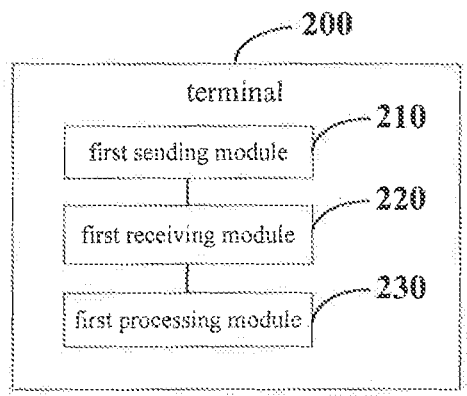
FIG. 2 is a schematic view of blocks of a terminal in the embodiments of the present disclosure.

As shown in FIG. 2, the terminal 200 in the embodiment of the present disclosure may send request information to a network device in the case that target Other SI is to be requested, receive a random access message two or a random access message four which is sent by the network device based on the request information and carries preset indication information, and determine whether to receive subsequent broadcast information based on the random access message two or the random access message four. The target Other SI is at least one of Other SI requested by a random access message one or Other SI requested by a random access message three, the Other SI is system information other than minimum system information. The terminal 200 includes the following modules:

a first sending module 210, configured to send request information to a network device in the case that target Other System Information (Other SI) is to be requested, where the target Other SI is at least one of Other SI requested by a random access message one or Other SI requested by a random access message three, the Other SI is system information other than minimum system information;

a first receiving module 220, configured to receive a random access message two or a random access message four which is sent by the network device based on the request information and carries preset indication information; and a first processing module 230, configured to determine whether to receive subsequent broadcast information based on the random access message two or the random access message four.

Optionally, the first processing module 230 includes:

a first acquiring sub-module, configured to acquire configuration information of the subsequent broadcast information in the case that the random access message two or the random access message four is received successfully, where the configuration information is configured to indicate identity information of the Other SI broadcasted by the subsequent broadcast information; and a first receiving sub-module, configured to receive the subsequent broadcast information through a preset transmission resource, in the case that the identity information corresponding to the subsequent broadcast information indicated by the configuration information includes the identity information of all or a part of system information of the target Other SI.

Optionally, the first processing module 230 further includes:

a first detecting sub-module, configured to detect the identity information for indicating the Other SI in the minimum system information, in the case that the random access message two or the random access message four is not received, where the identity information of the Other SI is configured to indicate the identity information of the Other SI broadcasted by current broadcast information or the subsequent broadcast information;

a second receiving sub-module, configured to receive the subsequent broadcast information through a preset transmission resource, in the case that the identity information of the Other SI includes the identity information of all or a part of system information of the target Other SI.

The indication information is acknowledgement (ACK) information, and the ACK information is configured to indicate that the network device receives the request information.

Optionally, the first processing module 230 includes:

a second acquiring sub-module, configured to acquire the configuration information of the subsequent broadcast information, in the case that the random access message two or the random access message four carries the ACK information, where the configuration information is configured to indicate the identity information of the Other SI broadcasted by the subsequent broadcast information;

a third receiving sub-module, configured to receive the subsequent broadcast information through a preset transmission resource, in the case that the identity information corresponding to the subsequent broadcast information indicated by the configuration information includes the identity information of all or a part of system information of the target Other SI.

Optionally, the first processing module 230 includes:

a second detecting sub-module, configured to detect the identity information for indicating the Other SI in the minimum system information, in the case that the random access message two or the random access message four does not carry the ACK information, where the identity information of the Other SI is configured to indicate the identity information of the Other SI broadcasted by current broadcast information or the subsequent broadcast information;

a fourth receiving sub-module, configured to receive the subsequent broadcast information through a preset transmission resource, in the case that the identity information of the Other SI includes the identity information of all or a part of system information of the target Other SI.

The indication information is ACK information, and the ACK information is configured to indicate that the subsequent broadcast information includes all or a part of system information of the target Other SI.

Optionally, the first processing module 230 includes:

a fifth receiving sub-module, configured to receive the subsequent broadcast information through a preset transmission resource, in the case that the random access message two or the random access message four carries the ACK information; or a first processing sub-module, configured to ignore the subsequent broadcast information, in the case that the random access message two or the random access message four does not carry the ACK information; or a third detecting sub-module, configured to detect the identity information for indicating the Other SI in the minimum system information, in the case that the random access message two or the random access message four does not carry the ACK information, where the identity information of the Other SI is configured to indicate the identity information of the Other SI broadcasted by the subsequent broadcast information;

a sixth receiving sub-module, configured to receive the subsequent broadcast information through a preset transmission resource, in the case that the identity information of the Other SI includes the identity information of all or a part of system information of the target Other SI;

the ACK information includes at least one of:

Other SI identity information, system information block identity information corresponding to the Other SI, system information block group identity information corresponding to the Other SI and system information block function identity information corresponding to the Other SI.

Optionally, the first processing module 230 further includes:

a seventh receiving sub-module, configured to receive the subsequent broadcast information through a preset transmission resource according to the system information block identity information corresponding to the ACK information, in the case that the random access message two or the random access message four carries the ACK information including the system information block identity information corresponding to the Other SI.

Optionally, the terminal further includes:

a second processing module, configured to, in the case that the random access message two or the random access message four carries the ACK information, stop sending the request information to the network device; or stop sending the request information to the network device within a preset time period; or activate a prohibit timer, and prohibiting the request information from being sent to the network device until the prohibit timer expires; or reset a counter or a timer corresponding to the request information.

Optionally, the first processing module 230 includes:

a first resetting sub-module, configured to reset the prohibit timer in the case that the received random access message two or the random access message four carries the ACK information.

The indication information is non-acknowledgement (NACK) information, and the NACK information is configured to indicate that the subsequent broadcast information does not include any system information in the target Other SI within a preset time period.

Optionally, the first processing module 230 includes:

a second processing sub-module, configured to stop sending the request information within the preset time period, in the case that the random access message two or the random access message four carries the NACK information.

Optionally, the first processing module 230 further includes:

a four detecting sub-module, configured to detect the identity information for indicating the Other SI in the minimum system information, in the case that the random access message two or the random access message four carries the NACK information, where the identity information of the Other SI is configured to indicate the identity information of the Other SI broadcasted by current broadcast information or the subsequent broadcast information;

an eighth receiving sub-module, configured to receive the subsequent broadcast information through a preset transmission resource, in the case that the identity information of the Other SI includes the identity information of all or a part of system information of the target Other SI.

Optionally, the terminal further includes:

a third processing module, configured to, in the case that the random access message two or the random access message four carries the NACK information, stop sending the request information to the network device; or stop sending the request information to the network device within a preset time period; or activate a prohibit timer, and prohibiting the request information from being sent to the network device until the prohibit timer expires; or activate a counter or a timer corresponding to the request information; or reset a counter or a timer corresponding to the request information.

Optionally, the third processing module includes:

a second resetting sub-module, configured to reset the prohibit timer in the case that the received random access message two or the random access message four carries the NACK information.

Optionally, the terminal further includes:

a second sending module, configured to reseed the request information to the network device, in the case that the random access message two or the random access message four is not received.

Optionally, the terminal further includes:

a fourth processing module, configured to, in the case that a number of times sending continuously the request information reaches a preset number of times and neither of the random access message two and the random access message four is received, stop sending the request information to the network device, or stop sending the request information to the network device within a preset time period, or activate a prohibit timer, where the terminal is prohibited from sending the request information to the network device until the prohibit timer expires.

Optionally, the fourth processing module includes:

a third processing sub-module, configured to deactivate the prohibit timer, in the case that all or a part of system information of the target Other SI requested by the request information is received.

According to the terminal in the embodiments of the present disclosure, the terminal sends request information to a network device in the case that the Other SI is to be requested, and then the network device may configure the corresponding random access message two or the random access message four based on the request information and carry the preset indication information therein to indicate the configuration information of the subsequent broadcast information. Therefore, when receiving the random access message two or the random access message four, the terminal may determine the subsequent processing based on the indication information, instead of sending the request information repeatedly in case of not receiving the ACK information, thereby saving the power consumption of the terminal to a certain extent.

In order to achieve the above object better, a terminal is further provided in the embodiments of the present disclosure, including: a processor, a memory and a computer program stored in the memory and executable by the processor, where the computer program is executed by the processor to perform the system information transmission method hereinabove. A computer-readable storage medium is farther provided in the embodiments of the present disclosure, where a computer program is stored in the computer-readable storage medium, where the computer program is executed by the processor to perform the system information transmission method hereinabove.

Figure 3:
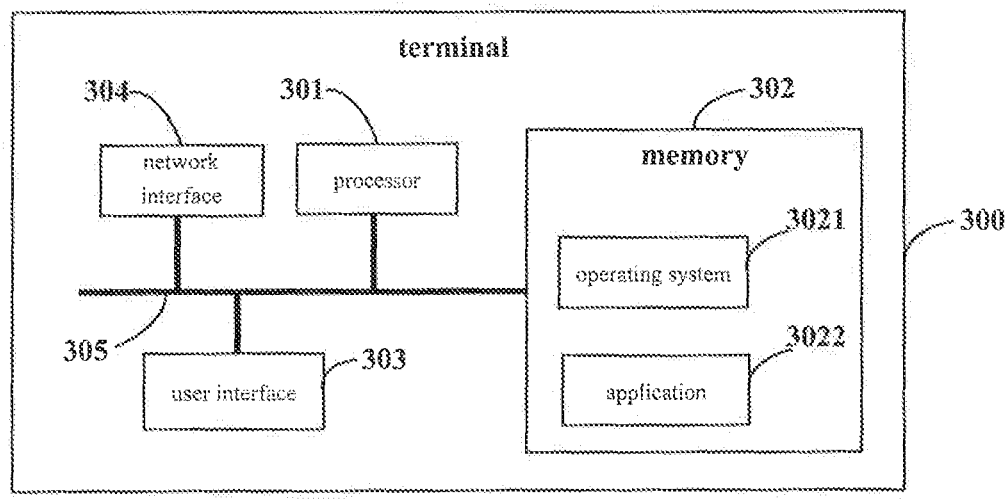
FIG. 3 is a schematic view of a terminal in the embodiments of the present disclosure.

Specifically, FIG. 3 is a schematic view of a terminal in the embodiment s of the present disclosure. The terminal 300 shown in FIG. 3 includes at least one processor 301, a memory 302, a user interface 303, and a network interface 304. The various components in terminal device 300 are coupled together by a bus system 305. It will be appreciated that the bus system 305 is configured to implement the communication between these components. The bus system 305 includes a power bus, a control bus, and a status signal bus in addition to the data bus, However, for clarity of description, various buses are labeled as bus system 305 in FIG. 3.

The user interface 303 can include a display or a pointing device (e.g., a touchpad or touch screen, etc.).

It should be understood that the memory 302 in the embodiments of the present disclosure may be a volatile memory or a non-volatile memory, or may include both volatile and non-volatile memory. The non-volatile memory may be a read-only memory (ROM), a programmable read only memory (PROM), an erasable programmable read only memory (EPROM), or an electric Erase programmable read only memory (EEPROM) or flash memory. The volatile memory may be a Random Access Memory (RAM) that acts as an external cache. By way of example and not limitation, many forms of RAM are available, such as static random access memory (SRAM), dynamic random access memory (DRAM), synchronous dynamic random access memory (SDRAM), Double Data Rate SDRAM (DDRSDRAM), Enhanced Synchronous Dynamic Random Access Memory (ESDRAM), Synchronous Connection Dynamic Random Access Memory (SDRAM) and Direct memory bus random access memory (DRRAM). The memory 302 of the systems and methods described herein is intended to comprise, without being limited to, these and any other suitable types of memory.

In some embodiments, the memory 302 stores elements, executable modules or data structures, or a subset thereof, or their extended set: operating system 3021 and application 3022.

The operating system 3021 includes various system programs, such as a framework layer, a core library layer, a driver layer, and the like, for implementing various basic services and processing hardware-based tasks. The application 3022 includes various applications, such as a media player (Media Player), a browser, and the like, for implementing various application services. A program implementing the method of the embodiment of the present disclosure may be included in the application 3022.

In an embodiment of the present disclosure, the terminal 300 further includes: a computer program stored on the memory 302 and executable on the processor 301, and specifically, may be a computer program in the application 3022, and the computer program is executed by the processor to: send request information to a network device in the case that target Other SI is to be requested; receive a random access message two or a random access message four which is sent by the network device based on the request information and carries preset indication information; and determine whether to receive subsequent broadcast information based on the random access message two or the random access message four, where the target Other SI is at least one of Other SI requested by a random access message one or Other SI requested by a random access message three, and the Other SI is system information other than minimum system information The method disclosed in the above embodiments of the present disclosure may be applied to the processor 301 or implemented by the processor 301. Processor 301 may be an integrated circuit chip with signal processing capabilities. In the implementation process, each step of the foregoing method may be completed by an integrated logic circuit of hardware in the processor 301 or an instruction in a form of software. The processor 301 may be a general-purpose processor, a digital signal processor (DSP), an application specific integrated circuit (ASIC), a Field Programmable Gate Array (FPGA), or the like, Programming logic devices, discrete gates or transistor logic devices, discrete hardware components. The methods, steps, and logical block diagrams disclosed in the embodiments of the present disclosure may be implemented or carried out. The general purpose processor may be a microprocessor or the processor or any conventional processor or the like. The steps of the method disclosed in the embodiments of the present disclosure may be directly implemented by the hardware decoding processor, or may be performed by a combination of hardware and software modules in the decoding processor. The software module can be located in a conventional storage medium such as random access memory, flash memory, read only memory, programmable read only memory or electrically erasable programmable memory, registers, and the like. The storage medium is located in the memory 302, and the processor 301 reads the information in the memory 302 and completes the steps of the above method in combination with its hardware.

It will be appreciated that the embodiments described herein can be implemented in hardware, software, firmware, middleware, microcode, or a combination thereof. For hardware implementation, the processing unit can be implemented in one or more Application Specific Integrated Circuits (ASICs), Digital Signal Processing (DSP), Digital Signal Processing Device (DSPD), programmable logic, Programmable Logic Device (PLD), Field-Programmable Gate Array (FPGA), general purpose processor, controller, microcontroller, microprocessor, other electronic unit for performing the functions described herein or a combination thereof.

For a software implementation, the techniques described herein can be implemented by modules (e.g., procedures, functions, and so on) that perform the functions described herein. The software code can be stored in memory and executed by the processor. The memory can be implemented in the processor or external to the processor.

Specifically, the computer program is executed by the processor 301 to: acquire configuration information of the subsequent broadcast information in the case that the random access message two or the random access message four is received successfully, where the configuration information is configured to indicate identity information of the Other SI broadcasted by the subsequent broadcast information; and receive the subsequent broadcast information through a preset transmission resource, in the ease that the identity information corresponding to the subsequent broadcast information indicated by the configuration information includes the identity information of all or a part of system information of the target Other SI.

Optionally, the computer program is executed by the processor 301 to: detect the identity information for indicating the Other SI in the minimum system information, in the case that the random access message two or the random access message four is not received, where the identity information of the Other SI is configured to indicate the identity information of the Other SI broadcasted by current broadcast information or the subsequent broadcast information;

receive the subsequent broadcast information through a preset transmission resource, in the case that the identity information of the Other SI includes the identity information of all or a part of system information of the target Other SI.

Optionally, the indication information is acknowledgement (ACK) information, and the ACK information is configured to indicate that the network device receives the request information.

Optionally, the computer program is executed by the processor 301 to: acquire the configuration information of the subsequent broadcast information, in the case that the random access message two or the random access message four carries the ACK information, where the configuration information is configured to indicate the identity information of the Other SI broadcasted by the subsequent broadcast information;

receive the subsequent broadcast information through a preset transmission resource, in the case that the identity information corresponding to the subsequent broadcast information indicated by the configuration information includes the identity information of all or a part of system information of the target Other SI.

Optionally, the computer program is executed by the processor 301 to: detect the identity information for indicating the Other SI in the minimum system information, in the case that the random access message two or the random access message four does not carry the ACK information, where the identity information of the Other SI is configured to indicate the identity information of the Other SI broadcasted by current broadcast information or the subsequent broadcast information;

receive the subsequent broadcast information through a preset transmission resource, in the case that the identity information of the Other SI includes the identity information of all or a part of system information of the target Other SI.

Optionally, the indication information is ACK information, and the ACK information is configured to indicate that the subsequent broadcast information includes all or a part of system information of the target Other SI.

Optionally, the computer program is executed by the processor 301 to: receive the subsequent broadcast information through a preset transmission resource, in the case that the random access message two or the random access message four carries the ACK information; or ignore the subsequent broadcast information, in the case that the random access message two or the random access message four does not carry the ACK information; or detect the identity information for indicating the Other SI in the minimum system information, in the case that the random access message two or the random access message four does not carry the ACK information, where the identity information of the Other SI is configured to indicate the identity information of the Other SI broadcasted by the subsequent broadcast information;

receive the subsequent broadcast information through a preset transmission resource, in the case that the identity information of the Other SI includes the identity information of all or a part of system information of the target Other SI.

Optionally, the ACK information includes at least one of:

Other SI identity information, system information block identity information corresponding to the Other SI, system information block group identity information corresponding to the Other SI and system information block function identity information corresponding to the Other SI.

Optionally, the computer program is executed by the processor 301 to: to receive the subsequent broadcast information through a preset transmission resource according to the system information block identity information corresponding to the ACK information, in the case that the random access message two or the random access message four carries the ACK information including the system information block identity information corresponding to the Other SI.

Optionally, the computer program is executed by the processor 301 to; in the case that the random access message two or the random access message four carries the ACK information, stop sending the request information to the network device; or stop sending the request information to the network device within a preset time period; or activate a prohibit timer, and prohibiting the request information from being sent to the network device until the prohibit tinier expires; or reset a counter or a timer corresponding to the request information, Optionally, the computer program is executed by the processor 301 to: reset the prohibit tinier in the case that the received random access message two or the random access message four carries the ACK information.

Optionally, the indication information is non-acknowledgement (NACK) information, and the NACK information is configured to indicate that the subsequent broadcast information does not include any system information in the target Other SI within a preset time period.

Optionally, the computer program is executed by the processor 301 to: stop sending the request information within the preset time period, in the case that the random access message two or the random access message four carries the NACK information.

Optionally, the computer program is executed by the processor 301 to: detect the identity information for indicating the Other SI in the minimum system information, in the case that the random access message two or the random access message four carries the NACK information, where the identity information of the Other SI is configured to indicate the identity information of the Other SI broadcasted by current broadcast information or the subsequent broadcast information;

receive the subsequent broadcast information through a preset transmission resource, in the case that the identity information of the Other SI includes the identity information of all or a part of system information of the target Other SI.

Optionally, the computer program is executed by the processor 301 to: in the case that the random access message two or the random access message four carries the NACK information, stop sending the request information to the network device; or stop sending the request information to the network device within a preset time period; or activate a prohibit timer, and prohibiting the request information from being sent to the network device until the prohibit timer expires; or activate a counter or a tinier corresponding to the request information; or reset a counter or a timer corresponding to the request information.

Optionally, the computer program is executed by the processor 301 to: reset the prohibit timer in the case that the received random access message two or the random access message four carries the NACK information.

Optionally, the computer program is executed by the processor 301 to: resend the corresponding request information to the network device, in the case that the random access message two or the random access message four is not received.

Optionally, the computer program is executed by the processor 301 to: in the case that a number of times sending continuously the request information reaches a preset number of times and neither of the random access message two and the random access message four is received, stop sending the request information to the network device, or stop sending the request information to the network device within a preset time period, or activate a prohibit timer, where the terminal is prohibited from sending the request information to the network device until the prohibit timer expires.

Optionally, the computer program is executed by the processor 301 to: deactivate the prohibit timer, in the case that all or a part of system information of the target Other SI requested by the request information is received.

The terminal may be a wireless terminal or a wired terminal, and the wireless terminal may be a device that provides voice and/or other service data connectivity to the user, a handheld device with a wireless connection function, or other processing device connected to the wireless modem. The wireless terminal can communicate with one or more core networks via a Radio Access Network (RAN), which can be a mobile terminal, such as a mobile phone (or "cellular" phone) and a mobile terminal. The computer, for example, can be a portable, pocket, handheld, computer built-in or in-vehicle mobile device that exchanges language and/or data with the wireless access network. For example, Personal Communication Service (PCS) telephone, cordless telephone, Session Initiation Protocol (SIP) telephone, Wireless Local Loop (WLL) station, Personal Digital Assistant (PDA) and other equipment. The wireless terminal may also be referred to as a system, a subscriber unit, a subscriber station, a mobile station, a mobile station, a remote station, a remote terminal, and a remote terminal, the access terminal, the user terminal, the user agent, and the user device or user equipment, which is not limited herein, According to the terminal in the embodiments of the present disclosure, the terminal sends request information to a network device in the case that the Other SI is to be requested, and then the network device may configure the corresponding random access message two or the random access message four based on the request information and carry the preset indication information therein to indicate the configuration information of the subsequent broadcast information. Therefore, when receiving the random access message two or the random access message four, the terminal may determine the subsequent processing based on the indication information, instead of sending the request information repeatedly in case of not receiving the ACK information, thereby saving the power consumption of the terminal to a certain extent, The above embodiment introduces the system information transmission method of the present disclosure at the terminal side. The following embodiment will further describe the system information transmission method at the network device side with reference to the drawings.

Figure 4:
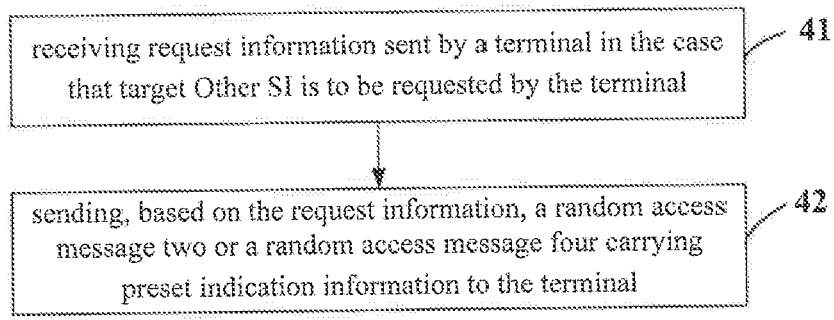
FIG. 4 is a schematic view of a system information transmission method of a network device side in the embodiments of the present disclosure.

As shown in FIG. 4 which is the schematic view of the system information transmission method in the embodiments of the present disclosure applied to the network device side, the method includes: p Step 41: receiving request information sent by a terminal in the case that target Other System Information (Other SI) is to be requested by the terminal, where the request information is sent through a random access message one or a random access message three, the target Other SI is at least one of Other SI, the Other SI is system information other than minimum system information. The request information may be sent through a random access message one MSG or a random access message three MSG3. It should be noted that the terminal in the embodiment of the present disclosure refers to a terminal that is in an idle state or an inactive state.

Step 42: sending, based on the request information, a random access message two or a random access message four carrying preset indication information to the terminal.

According to the correspondence between the messages in the random access procedure, if the request information is sent by the MSG1, the network device configures the random access message two MSG2 for the terminal, and if the request information is sent by the MSG3, the network device configures the random access message four MSG 4 for the terminal.

Step 42 specifically includes: sending the random access message two or the random access message four carrying the preset indication information to the terminal, in the case that the request information is successfully received.

Here, the network device sends the MSG2 or MSG4 to the terminal only in order to respond to the received request information.

The network device may implicitly carry an ACK message through the random access message two or the random access message. That is, if the request information is successfully received, the network device sends a random access message two or a random access message four that implicitly carries the ACK information to the terminal.

The indication information is ACK information, and the ACK information is configured to indicate that the network device receives the request information.

In this case, Step 42 specifically includes: in the case that the request information is successfully received, sending the random access message two or the random access message four carrying the ACK information to the terminal, or sending the random access message two or the random access message four carrying the ACK information and configuration information of subsequent broadcast information to the terminal Further, the indication information is ACK information, and the ACK information is configured to indicate that subsequent broadcast information includes all or a part of system information of the target Other SI.

In this case, Step 42 specifically includes:

sending the random access message two or the random access message four carrying the ACK information to the terminal, in the case that the request information is successfully received and the subsequent broadcast information includes all or a part of system information of the target Other SI; or sending the random access message two or the random access message four not carrying the ACK information to the terminal, in the case that the request information is successfully received and the subsequent broadcast information does not include any system information of the target Other SI; or sending the random access message two or the random access message four not carrying the ACK information to the terminal, in the case that the request information is successfully received and the minimum system information carries configuration information for indicating the subsequent broadcast information.

Further, the indication information may also be non-acknowledgement (NACK) information, and the NACK information is configured to indicate that the subsequent broadcast information does not include any system information in the target Other SI within a preset time period.

In this case, Step 42 further includes:

sending the random access message two or the random access message four carrying the NACK information to the terminal, in the case that the request information is successfully received and the subsequent broadcast information does not include any system information of the target Other SI; or sending the random access message two or the random access message four carrying the HACK information to the terminal, in the case that the request information is successfully received and the minimum system information carries configuration information for indicating the subsequent broadcast information.

In addition to the scenario of the different indication information, in the system information transmission method of the embodiment of the present disclosure, Step 42 may further include:

in the case that the request information is successfully received and subsequent broadcast information includes all or a part of system information of the target Other SI, sending the random access message two or the random access message four carrying configuration information of the subsequent broadcast information to the terminal; or in the case that the request information is successfully received and the minimum system information carries indication information for indicating the Other SI, sending the corresponding random access message two or the random access message four to the terminal, where the identity information of the Other SI is configured to indicate the identity information of the Other SI (SI-ID) broadcasted by the subsequent broadcast information. The SI-ID specifically includes at least one of the following: Other System Information identity information (SI ID), system information block identity information (SIB ID) corresponding to the Other SI, system information block group identity information (SIB group ID) corresponding to the Other SI and system information block function identity information (SIB Functionality ID) corresponding to the Other SI.

According to the system information transmission method in the embodiments of the present disclosure, when the network device sends the random access message two or the random access message four based on the request information of the terminal, the random access message two or the random access message four carries the preset indication information for indicating the configuration information of the subsequent broadcast information, so as to enable the terminal to determine the subsequent processing based on the indication information, instead of sending the request information repeatedly in case of not receiving the ACK information, thereby saving the power consumption of the terminal to a certain extent, and also reducing the conflict probability of the random access message through which different terminals send the request information.

Figure 5:
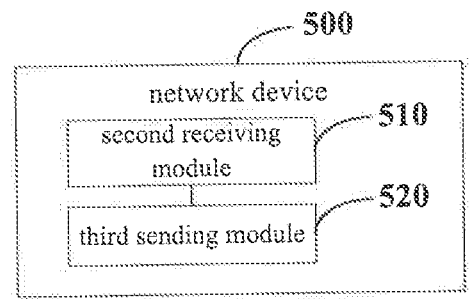
FIG. 5 is a schematic view of blocks of a network device in the embodiments of the present disclosure.

The above embodiment describes the system information transmission method in different scenarios. The network device corresponding thereto will be further described in the following with reference to the drawings, As shown in FIG. 5, the network device 500 in the embodiments of the present disclosure may perform: receiving request information sent by a terminal in the ease that target Other System Information (Other SI) is to be requested by the terminal; sending, based on the request information, a random access message two or a random access message four carrying preset indication information to the terminal, where the request information is sent through a random access message one or a random access message three, the target Other SI is at least one of Other SI, the Other SI is system information other than minimum system information. The network device 500 further includes the following function modules:

a second receiving module 510, configured to receive request information sent by a terminal in the case that target Other System Information (Other SI) is to be requested by the terminal, where the request information is sent through a random access message one or a random access message three, the target Other SI is at least one of Other SI, the Other SI is system information other than minimum system information;

a third sending module 520, configured to send, based on the request information, a random access message two or a random access message four carrying preset indication information to the terminal.

Optionally, the third sending module 520 includes:

a first sending sub-module, configured to send the random access message two or the random access message four carrying the preset indication information to the terminal, in the case that the request information is successfully received.

Optionally, the third sending module 520 includes:

a second sending sub-module, configured to send the random access message two or the random access message four carrying the preset indication information to the terminal, in the case that the request information is successfully received, where the random access message two or the random access message four carries implicitly acknowledgement (ACK) information.

Optionally, the indication information is ACK information, and the ACK information is configured to indicate that the network device receives the request information.

Optionally, the third sending module 520 includes a third sending sub-module, configured to, in the case that the request information is successfully received, send the random access message two or the random access message four carrying the ACK information to the terminal, or send the random access message two or the random access message four carrying the ACK information and configuration information of subsequent broadcast information to the terminal.

Optionally, the indication information is ACK information, and the ACK information is configured to indicate that subsequent broadcast information includes all or a part of system information of the target Other SI.

Optionally, the third sending module 520 includes:

a fourth sending sub-module, configured to send the random access message two or the random access message four carrying the ACK information to the terminal, in the case that the request information is successfully received and the subsequent broadcast information includes all or a part of system information of the target Other SI; or a fifth sending sub-module, configured to send the random access message two or the random access message four not carrying the ACK information to the terminal, in the case that the request information is successfully received and the subsequent broadcast information does not include any system information of the target Other SI; or p a sixth sending sub-module, configured to send the random access message two or the random access message four not carrying the ACK information to the terminal, in the case that the request information is successfully received and the minimum system information carries configuration information for indicating the subsequent broadcast information.

Optionally, the indication information is non-acknowledgement (NACK) information, and the NACK information is configured to indicate that the subsequent broadcast information does not include any system information in the target Other SI within a preset time period.

Optionally, the third sending module 520 includes:

a seventh sending sub-module, configured to send the random access message two or the random access message four carrying the NACK information to the terminal, in the case that the request information is successfully received and the subsequent broadcast information does not include any system information of the target Other SI; or an eighth sending sub-module, configured to send the random access message two or the random access message four carrying the NACK information to the terminal, in the case that the request information is successfully received and the minimum system information carries configuration information for indicating the subsequent broadcast information.

Optionally, the third sending module 520 includes:

a ninth sending sub-module, configured to, in the case that the request information is successfully received and subsequent broadcast information includes all or a part of system information of the target Other SI, send the random access message two or the random access message four carrying configuration information of the subsequent broadcast information to the terminal; or a tenth sending sub-module, configured to, in the case that the request information is successfully received and the minimum system information carries indication information for indicating the Other SI, send the corresponding random access message two or the random access message four to the terminal, where the identity information of the Other SI is configured to indicate the identity information of the Other SI broadcasted by the subsequent broadcast information.

It is to be noted that, according to the network device in the embodiments of the present disclosure, when the network device sends the random access message two or the random access message four based on the request information of the terminal, the random access message two or the random access message four carries the preset indication information for indicating the configuration information of the subsequent broadcast information, so as to enable the terminal to determine the subsequent processing based on the indication information, instead of sending the request information repeatedly in case of not receiving the ACK information, thereby saving the power consumption of the terminal to a certain extent, and also reducing the conflict probability of the random access message through which different terminals send the request information, It should be noted that the division of each module of the above network device and terminal is only a division of logical functions, in actual implementation, it may be integrated into one physical entity in whole or in part, or may be physically separated. And these modules can all be implemented by software in the form of processing component calls; or all of them can be implemented in hardware form; some modules can be realized by processing component calling software, and some modules are realized by hardware. For example, the determining module may be a separately set processing element, or may be integrated in one of the above-mentioned devices, or may be stored in the memory of the above device in the form of program code, the functions of the above determination module is called and executed by a processing element of the above device. The implementation of other modules is similar. In addition, all or part of these modules can be integrated or implemented independently. The processing elements described herein can be an integrated circuit with signal processing capabilities. In the implementation process, each step of the above method or each of the above modules may be completed by an integrated logic circuit of hardware in the processor element or an instruction in a form of software.

For example, the above modules may be one or more integrated circuits configured to implement the above method, such as one or more Application Specific Integrated Circuits (ASICs), or one or more microprocessors digital signal processor (DSP), or one or more Field Programmable Gate Array (FPGA). For another example, when one of the above modules is implemented in the form of a processing component scheduler code, the processing component may be a general purpose processor, such as a central processing unit (CPU) or other processor that can call the program code. As another example, these modules can be integrated and implemented in the form of a system-on-a-chip (SOC).

In order to better achieve the above object, a network device is further provided in the embodiments of the present disclosure, including: a processor, a memory and a computer program stored in the memory and executable by the processor, where the computer program is executed by the processor to perform the system information transmission method hereinabove. A computer-readable storage medium is further provided in the embodiments of the present disclosure, where a computer program is stored in the computer-readable storage medium, where the computer program is executed by the processor to perform the system information transmission method hereinabove.

Figure 6:
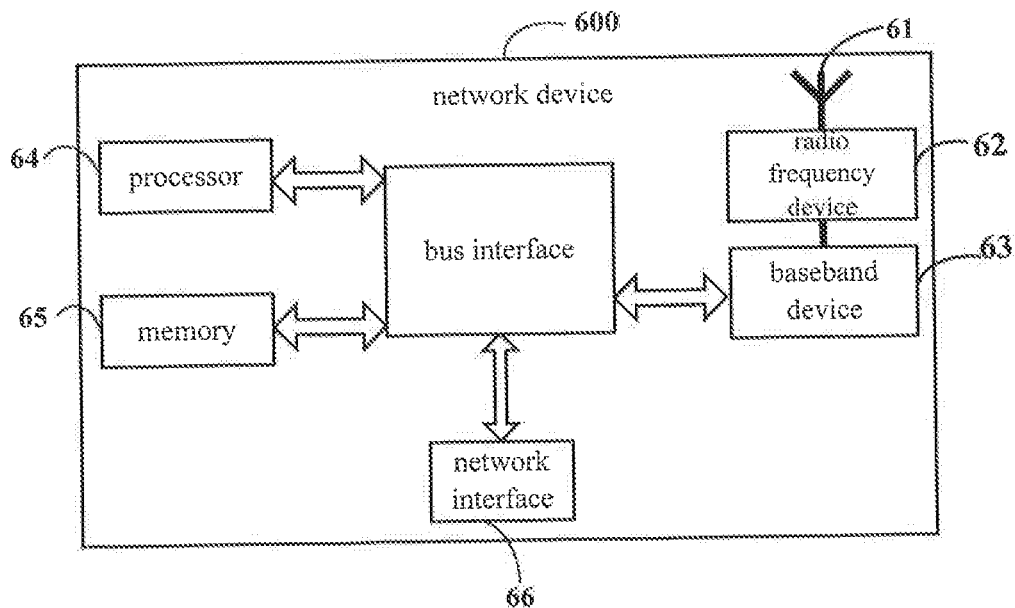
FIG. 6 is a schematic view of a network device in the embodiments of the present disclosure.

Specifically, a network device is farther provided in the embodiments of the present disclosure, As shown in FIG. 6, the network device 600 includes an antenna 61, a radio frequency device 62, and a baseband device 63. The antenna 61 is connected to the radio frequency device 62. In the upstream direction, the radio frequency device 62 receives information via the antenna 61 and transmits the received information to the baseband device 63 for processing. In the downstream direction, the baseband device 63 processes the information to be transmitted and transmits it to the radio frequency device 62. The radio frequency device 62 processes the received information and transmits it via the antenna 61.

The above-described band processing device may be located in the baseband device 63, and the method performed by the network device in the above embodiment may be implemented in the baseband device 63, which includes the processor 164 and the memory 65.

The baseband device 63 may include, for example, at least one baseband board on which a plurality of chips are disposed, as shown in FIG. 6, one of which is, for example, a processor 64, connected to the memory 65 to call a program in the memory 65 to execute The network side device operation shown in the above method embodiment.

The baseband device 63 can also include a network interface 66 for interacting with the radio frequency device 62, such as a common public radio interface (CPRI).

The processor here may be a processor or a collective name of multiple processing elements. For example, the processor may be a CPU, are ASIC, or one configured to implement the method performed by the network side device. A plurality of integrated circuits, such as one or more microprocessor DSPs, or one or more field programmable gate array FPGAs, and the like. The storage element can be a memory or a collective name for a plurality of storage elements.

Memory 65 may be either a volatile memory or a non-volatile memory, or may include both volatile and non-volatile memory. The non-volatile memory may be a Read-Only Memory (ROM), a Programmable ROM, or an Erasable PROM (EPROM), electrically erasable programmable read only memory (EEPROM) or flash memory, The volatile memory may be a Random Access Memory (RAM), which is used as an external cache. By way of example and not limitation, many forms of RAM are available, such as static random access memory (SRAM), dynamic random access memory (DRAM), synchronous dynamic random access memory (SDRAM), Double Data Rate SDRAM (DDRSDRAM), Enhanced Synchronous Dynamic Random Access Memory (ESDRAM), Synchronized Dynamic. Random Access Memory (SLDRAM) and Direct Memory Bus Random Access Memory (DRRAM). The memory 65 described herein is intended to comprise, without being limited to, these and any other suitable types of memory.

Specifically, the network device in the embodiments of the present disclosure further includes: a computer program stored in the memory 65 and executable an the processor 64, and the processor 64 calls a computer program in the memory 65 to execute the method executed by each module shown in FIG. 5.

Specifically, the computer program is called by the processor 64 to: receive request information sent by a terminal in the case that target Other System Information (Other SI) is to be requested by the terminal; send, based on the request information, a random access message two or a random access message four carrying preset indication information to the terminal, where the request information is sent through a random access message one or a random access message three, the target Other SI is at least one of Other SI, the Other SI is system information other than minimum system information.

Optionally, the computer program is called by the processor 64 to: send the random access message two or the random access message four carrying the preset indication information to the terminal, in the case that the request information is successfully received.

Optionally, the computer program is called by the processor 64 to: send the random access message two or the random access message four carrying the preset indication information to the terminal, in the case that the request information is successfully received, where the random access message two or the random access message four carries implicitly acknowledgement (ACK) information.

Optionally, the indication information is ACK information, and the ACK information is configured to indicate that the network device receives the request information.

Optionally, the computer program is called by the processor 64 to: in the case that the request information is successfully received, send the random access message two or the random access message four carrying the ACK information to the terminal, or send the random access message two or the random access message four carrying the ACK information and configuration information of subsequent broadcast information to the terminal.

Optionally, the indication information is ACK information, and the ACK information is configured to indicate that subsequent broadcast information includes all or a part of system information of the target Other SI.

Optionally, the computer program is called by the processor 64 to: send the random access message two or the random access message four carrying the ACK information to the terminal, in the case that the request information is successfully received and the subsequent broadcast information includes all or a part of system information of the target Other SI; or send the random access message two or the random access message four not carrying the ACK information to the terminal, in the case that the request information is successfully received and the subsequent broadcast information does not include any system information of the target Other SI; or send the random access message two or the random access message four not carrying the ACK information to the terminal, in the case that the request information is successfully received and the minimum system information carries configuration information for indicating the subsequent broadcast information.

Optionally, the indication information is non-acknowledgement (NACK) information, and the NACK information is configured to indicate that the subsequent broadcast information does not include any system information in the target Other SI within a preset time period.

Optionally, the computer program is called by the processor 64 to: send the random access message two or the random access message four carrying the NACK information to the terminal, in the case that the request information is successfully received and the subsequent broadcast information does not include any system information of the target Other SI; or send the random access message two or the random access message four carrying the NACK information to the terminal, in the case that the request information is successfully received and the minimum system information carries configuration information for indicating the subsequent broadcast information, Optionally, the computer program is called by the processor 64 to: in the case that the request information is successfully received and subsequent broadcast information includes all or a part of system information of the target Other SI, send the random access message two or the random access message four carrying configuration information of the subsequent broadcast information to the terminal; or in the case that the request information is successfully received and the minimum system information carries indication information for indicating the Other SI, send the corresponding random access message two or the random access message four to the terminal, where the identity information of the Other SI is configured to indicate the identity information of the Other SI broadcasted by the subsequent broadcast information.

The network device may include multiple transceiver nodes (TRPs), and may be a base station (Base Transceiver Station, BTS for short) in Global System of Mobile communication (GSM) or Code Division Multiple Access (CDMA). The base station (NodeB, NB for short) in the Wideband Code Division Multiple Access (WCDMA), or the Evolutionary Node B (eNB or eNodeB) in the UR Or a relay station or an access point, or a base station in a future 5G network, etc., is not limited herein.

According to the network device in the embodiments of the present disclosure, when the network device sends the random access message two or the random access message four based on the request information of the terminal, the random access message two or the random access message four carries the preset indication information for indicating the configuration information of the subsequent broadcast information, so as to enable the terminal to determine the subsequent processing based on the indication information, instead of sending the request information repeatedly in case of not receiving the ACK information, thereby saving the power consumption of the terminal to a certain extent, and also reducing the conflict probability of the random access message through which different terminals send the request information.

Those skilled in the art will appreciate that the elements and algorithm steps of the various examples described in connection with the embodiments disclosed herein can be implemented in electronic hardware or a combination of computer software and electronic hardware. Whether these functions are performed in hardware or software depends on the specific application and design constraints of the solution. A person skilled in the art can use different methods for implementing the described functions for each particular application, hut such implementation should not be considered to be beyond the scope of the present disclosure.

A person skilled in the art can clearly understand that for the convenience and brevity of the description, the specific working process of the system, the device and the unit described above can refer to the corresponding process in the foregoing method embodiment, and details are not described herein again.

In the embodiments provided by the present application, it should be understood that the disclosed apparatus and method may be implemented in other manners. For example, the device embodiments described above are merely illustrative. For example, the division of the unit is only a logical function division, in actual implementation, there may be another division manner, for example, multiple units or components may be combined or can be integrated into another system, or some features can be ignored or not executed. In addition, the mutual coupling or direct coupling or communication connection shown or discussed may be an indirect coupling or communication connection through some interface, device or unit, and may be in an electrical, mechanical or other form.

The units described as separate components may or may not be physically separated, and the components displayed as units may or may not be physical units, that is, may be located in one place, or may be distributed to multiple network units, Some or all of the units may be selected according to actual needs to achieve the purpose of the solution of the embodiment.

In addition, each functional unit in each embodiment of the present disclosure may be integrated into one processing unit, or each unit may exist physically separately, or two or more units may be integrated into one unit.

The functions may be stored in a computer-readable storage medium if implemented in the form of a software functional unit and sold or used as a standalone product. Based on such understanding, the technical solution of the present disclosure, which is essential or contributes to the prior art, or a part of the technical solution, may be embodied in the form of a software product, which is stored in a storage medium, including The instructions are used to cause a computer device (which may be a personal computer, server, or network device, etc.) to perform all or part of the steps of the methods described in various embodiments of the present disclosure. The foregoing storage medium includes various media that can store program codes, such as a USB flash drive, a mobile hard disk, a ROM, a RAM, a magnetic disk, or an optical disk.

Moreover, it should be noted that in the apparatus and method of the present disclosure, it is apparent that the various components or steps may be decomposed and/or recombined. These decompositions and/or re-combinations should be considered as equivalents to the disclosure. Also, the steps of performing the above-described series of processes may naturally be performed in chronological order in the order illustrated, but need not necessarily be performed in chronological order, and some steps may be performed in parallel or independently of each other. It will be appreciated by those skilled in the art that all or any of the steps or components of the method and apparatus of the present disclosure may be in the network of any computing device (including a processor, storage medium, etc.) or computing device, in hardware or firmware. The software, or a combination thereof, is implemented by those of ordinary skill in the art using their basic programming skills while reading the description of the present disclosure.

Thus, the objects of the disclosure can also be achieved by running a program or a set of programs on any computing device. The computing device can be a well-known general purpose device. Accordingly, the object of the present disclosure can also be achieved by merely providing a program product comprising program code for implementing the method or apparatus. That is, such a program product also constitutes the present disclosure, and a storage medium storing such a program product also constitutes the present disclosure. It will be apparent that the storage medium may be any known storage medium or any storage medium developed in the future. It should also be noted that in the apparatus and method of the present disclosure, it is apparent that the various components or steps may be decomposed and/or recombined. These decompositions and/or re-combinations should be considered as equivalents to the disclosure. Also, the steps of performing the series of processes described above may naturally be performed in chronological order in the order illustrated, but need not necessarily be performed in chronological order. Certain steps may be performed in parallel or independently of one another.

The above are only some embodiments of the present disclosure, and it should be noted that those skilled in the art may also make several improvements and refinements without departing from the principles of the present disclosure, which should also be considered as the scope of the present disclosure.

What is claimed is:

1. A system information transmission method, performed by a terminal side, comprising:
  sending request information to a network device in the case that target Other System Information (Other SI) is to be requested, wherein the target Other SI is at least one of Other SI requested by a random access message one or Other SI requested by a random access message three, the Other SI is system information other than minimum system information;
  receiving a random access message two or a random access message four which is sent by the network device based on the request information and carries preset indication information; and
  determining whether to receive subsequent broadcast information based on the random access message two or the random access message four;
  wherein the determining whether to receive the subsequent broadcast information based on the random access message two or the random access message four comprises:
  acquiring configuration information of the subsequent broadcast information in the case that the random access message two or the random access message four is received successfully, wherein the configuration information is configured to indicate identity information of the Other SI broadcasted by the subsequent broadcast information; and
  receiving the subsequent broadcast information through a preset transmission resource, in the case that the identity information corresponding to the subsequent broadcast information indicated by the configuration information comprises the identity information of all or a part of system information of the target Other SI;
  or
  detecting the identity information for indicating the Other SI in the minimum system information, in the case that the random access message two or the random access message four is not received, wherein the identity information of the Other SI is configured to indicate the identity information of the Other SI broadcasted by current broadcast information or the subsequent broadcast information;

receiving the subsequent broadcast information through a preset transmission resource, in the case that the identity information of the Other SI comprises the identity information of all or a part of system information of the target Other SI.

2. The system information transmission method according to claim 1, wherein the indication information is acknowledgement (ACK) information, and the ACK information is configured to indicate that the network device receives the request information.

3. The system information transmission method according to claim 2, wherein the determining whether to receive the subsequent broadcast information based on the random access message two or the random access message four comprises:

acquiring the configuration information of the subsequent broadcast information, in the case that the random access message two or the random access message four carries the ACK information, wherein the configuration information is configured to indicate the identity information of the Other SI broadcasted by the subsequent broadcast information;

receiving the subsequent broadcast information through a preset transmission resource, in the case that the identity information corresponding to the subsequent broadcast information indicated by the configuration information comprises the identity information of all or a part of system information of the target Other SI.

4. The system information transmission method according to claim 1, wherein the indication information is ACK information, and the ACK information is configured to indicate that the subsequent broadcast information comprises all or a part of system information of the target Other SI;

wherein the determining whether to receive the subsequent broadcast information based on the random access message two or the random access message four comprises:

receiving the subsequent broadcast information through a preset transmission resource, in the case that the random access message two or the random access message four carries the ACK information; or ignoring the subsequent broadcast information, in the case that the random access message two or the random access message four does not carry the ACK information; or detecting the identity information for indicating the Other SI in the minimum system information, in the case that the random access message two or the random access message four does not carry the ACK information, wherein the identity information of the Other SI is configured to indicate the identity information of the Other SI broadcasted by the subsequent broadcast information;

receiving the subsequent broadcast information through a preset transmission resource, in the case that the identity information of the Other SI comprises the identity information of all or a part of system information of the target Other SI;

and/or, the ACK information comprises at least one of: Other SI identity information, system information block identity information corresponding to the Other SI, system information block group identity information corresponding to the Other SI and system information block function identity information corresponding to the Other SI.

5. The system information transmission method according to claim 2, wherein subsequent to the receiving the random access message two or the random access message four which is sent by the network device based on the request information and carries the preset indication information, the method further comprises:

in the case that the random access message two or the random access message four carries the ACK information, stopping sending the request information to the network device; or stopping sending the request information to the network device within a preset time period; or activating a prohibit timer, and prohibiting the request information from being sent to the network device until the prohibit timer expires; or resetting a counter or a timer corresponding to the request information.

6. The system information transmission method according to claim 1, wherein the indication information is non-acknowledgement (NACK) information, and the NACK information is configured to indicate that the subsequent broadcast information does not include any system information in the target Other SI within a preset time period.

7. The system information transmission method according to claim 6, wherein the determining whether to receive the subsequent broadcast information based on the random access message two or the random access message four comprises:

stopping sending the request information within the preset time period, in the case that the random access message two or the random access message four carries the NACK information.

8. The system information transmission method according to claim 6, wherein the determining whether to receive the subsequent broadcast information based on the random access message two or the random access message four comprises:

detecting the identity information for indicating the Other SI in the minimum system information, in the case that the random access message two or the random access message four carries the NACK information, wherein the identity information of the Other SI is configured to indicate the identity information of the Other SI broadcasted by current broadcast information or the subsequent broadcast information;

receiving the subsequent broadcast information through a preset transmission resource, in the case that the identity information of the Other SI comprises the identity information of all or a part of system information of the target Other SI.

9. The system information transmission method according to claim 6, wherein subsequent to the receiving the random access message two or the random access message four which is sent by the network device based on the request information and carries the preset indication information, the method further comprises:

in the case that the random access message two or the random access message four carries the NACK information, stopping sending the request information to the network device; or stopping sending the request information to the network device within a preset time period; or activating a prohibit timer, and prohibiting the request information from being sent to the network device until the prohibit timer expires; or activating a counter or a timer corresponding to the request information; or resetting a counter or a timer corresponding to the request information;

wherein subsequent to the receiving the random access message two or the random access message four which is sent by the network device based on the request information and carries the preset indication information, the method further comprises:

resetting the prohibit timer in the case that the received random access message two or the random access message four carries the NACK information.

10. The system information transmission method according to claim 1, wherein subsequent to the resending the corresponding request information to the network device, the method further comprises:

in the case that a number of times sending continuously the request information reaches a preset number of times and neither of the random access message two and the random access message four is received, stopping sending the request information to the network device, or stopping sending the request information to the network device within a preset time period, or activating a prohibit timer, wherein the terminal is prohibited from sending the request information to the network device until the prohibit timer expires.

11. A terminal, comprising: a processor, a memory and a computer program stored in the memory and executable by the processor, wherein the computer program is executed by the processor to:

send request information to a network device in the case that target Other System Information (Other SI) is to be requested, wherein the target Other SI is at least one of Other SI requested by a random access message one or Other SI requested by a random access message three, the Other SI is system information other than minimum system information;

receive a random access message two or a random access message four which is sent by the network device based on the request information and carries preset indication information; and determine whether to receive subsequent broadcast information based on the random access message two or the random access message four;

wherein the computer program is executed by the processor to:

acquire configuration information of the subsequent broadcast information in the case that the random access message two or the random access message four is received successfully, wherein the configuration information is configured to indicate identity information of the Other SI broadcasted by the subsequent broadcast information; and receive the subsequent broadcast information through a preset transmission resource, in the case that the identity information corresponding to the subsequent broadcast information indicated by the configuration information comprises the identity information of all or a part of system information of the target Other SI;

or the computer program is executed by the processor to:

detect the identity information for indicating the Other SI in the minimum system information, in the case that the random access message two or the random access message four is not received, wherein the identity information of the Other SI is configured to indicate the identity information of the Other SI broadcasted by current broadcast information or the subsequent broadcast information;

receive the subsequent broadcast information through a preset transmission resource, in the case that the identity information of the Other SI comprises the identity information of all or a part of system information of the target Other SI.

12. The terminal according to claim 11, wherein subsequent to resending the corresponding request information to the network device, the computer program is executed by the processor to:

in the case that a number of times sending continuously the request information reaches a preset number of times and neither of the random access message two and the random access message four is received, stop sending the request information to the network device, or stop sending the request information to the network device within a preset time period, or activate a prohibit timer, wherein the terminal is prohibited from sending the request information to the network device until the prohibit timer expires.

13. A system information transmission method, performed by a network device side, comprising:

receiving request information sent by a terminal in the case that target Other System Information (Other SI) is to be requested by the terminal, wherein the request information is sent through a random access message one or a random access message three, the target Other SI is at least one of Other SI, the Other SI is system information other than minimum system information;

sending, based on the request information, a random access message two or a random access message four carrying preset indication information to the terminal;

wherein the sending, based on the request information, the random access message two or the random access message four carrying preset indication information to the terminal comprises:

in the case that the request information is successfully received and subsequent broadcast information comprises all or a part of system information of the target Other SI, sending the random access message two or the random access message four carrying configuration information of the subsequent broadcast information to the terminal;

or in the case that the request information is successfully received and the minimum system information carries indication information for indicating the Other SI, sending the corresponding random access message two or the random access message four to the terminal, wherein the identity information of the Other SI is configured to indicate the identity information of the Other SI broadcasted by the subsequent broadcast information.

14. The system information transmission method according to claim 13, wherein the sending, based on the request information, the random access message two or the random access message four carrying preset indication information to the terminal comprises:

sending the random access message two or the random access message four carrying the preset indication information to the terminal, in the case that the request information is successfully received.

15. The system information transmission method according to claim 13, wherein the sending, based on the request information, the random access message two or the random access message four carrying preset indication information to the terminal comprises:

sending the random access message two or the random access message four carrying the preset indication information to the terminal, in the case that the request information is successfully received, wherein the random access message two or the random access message four carries implicitly acknowledgement (ACK) information.

16. The system information transmission method according to claim 13, wherein the indication information is ACK information, and the ACK information is configured to indicate that the network device receives the request information.

17. The system information transmission method according to claim 13, wherein the indication information is ACK information, and the ACK information is configured to indicate that subsequent broadcast information comprises all or a part of system information of the target Other SI;

wherein the sending, based on the request information, the random access message two or the random access message four carrying preset indication information to the terminal comprises:

sending the random access message two or the random access message four carrying the ACK information to the terminal, in the case that the request information is successfully received and the subsequent broadcast information comprises all or a part of system information of the target Other SI; or sending the random access message two or the random access message four not carrying the ACK information to the terminal, in the case that the request information is successfully received and the subsequent broadcast information does not comprise any system information of the target Other SI; or sending the random access message two or the random access message four not carrying the ACK information to the terminal, in the case that the request information is successfully received and the minimum system information carries configuration information for indicating the subsequent broadcast information.

18. A network device, comprising: a processor, a memory and a computer program stored in the memory and executable by the processor, wherein the computer program is executed by the processor to perform the system information transmission method according to claim 13.

19. The network device according to claim 18, wherein the sending, based on the request information, the random access message two or the random access message four carrying preset indication information to the terminal comprises:

sending the random access message two or the random access message four carrying the preset indication information to the terminal, in the case that the request information is successfully received.

20. The network device according to claim 18, wherein the sending, based on the request information, the random access message two or the random access message four carrying preset indication information to the terminal comprises:

sending the random access message two or the random access message four carrying the preset indication information to the terminal, in the case that the request information is successfully received, wherein the random access message two or the random access message four carries implicitly acknowledgement (ACK) information.

* * * * *